F. D. HUNTOON.
FLY TRAP.
APPLICATION FILED MAR. 31, 1916.

1,213,200. Patented Jan. 23, 1917.

Witnesses
R. D. Tolman.
Penelope Comberbach.

Inventor
Frank D. Huntoon.
By Geo. H. Kennedy jr.
Attorney

UNITED STATES PATENT OFFICE.

FRANK D. HUNTOON, OF WORCESTER, MASSACHUSETTS, ASSIGNOR TO NATIONAL MANUFACTURING COMPANY, OF WORCESTER, MASSACHUSETTS, A CORPORATION OF MASSACHUSETTS.

FLY-TRAP.

1,213,200.      Specification of Letters Patent.      Patented Jan. 23, 1917.

Application filed March 31, 1916. Serial No. 88,103.

*To all whom it may concern:*

Be it known that I, FRANK D. HUNTOON, a citizen of the United States, residing at Worcester, in the county of Worcester and Commonwealth of Massachusetts, have invented a new and useful Improvement in Fly-Traps, of which the following, together with the accompanying drawing, is a specification.

The present invention relates to the construction of fly traps, of the type constituted by a dome-like inclosure of foraminous or screen material into which the flies or other insects enter, after being attracted by the bait provided for this purpose, and from which they have no escape save by exit through the small and restricted inlet opening; the formation of this opening in a wall of the inclosure which requires the fly to crawl downwardly, instead of in the invariable upward direction which he takes, insures the imprisonment of the flies within the inclosure, in the manner common to the operation of previously known devices of this class.

The invention resides in novel details of construction, by which the construction of devices of this class is facilitated, and the cost of the same reduced, particularly with respect to the manner in which the body of the foraminous inclosure is attached to a sheet metal base or pan.

The features of the invention are fully set forth in the following description and illustrated in the accompanying drawing, in which—

Figure 1:
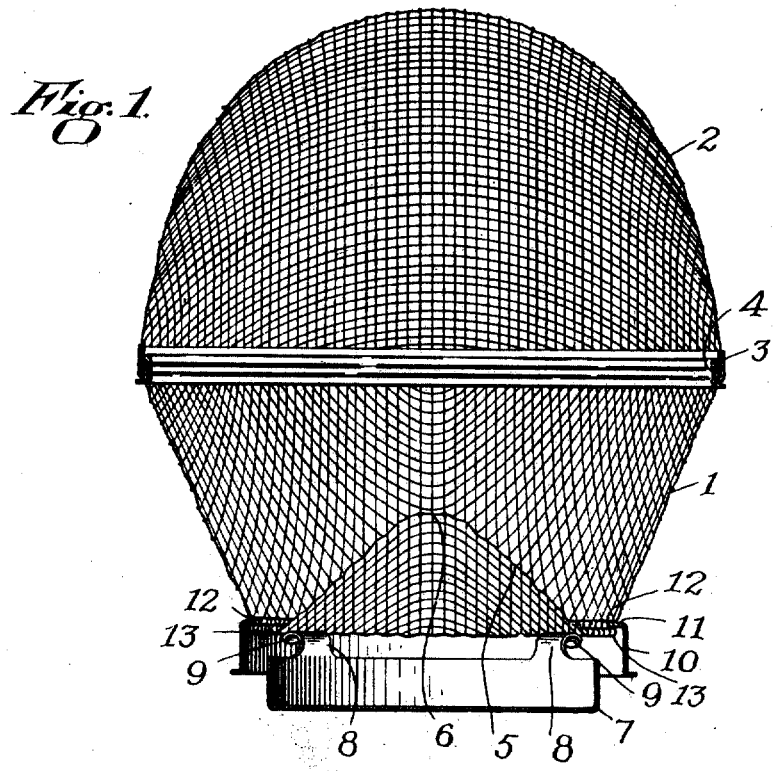
Figure 2:

Figure 1 is a vertical cross section of my improved fly trap. Fig. 2 is a fragmentary view, in elevation, of the foraminous inclosure, showing the construction of the lower end thereof.

Similar reference characters refer to similar parts in both figures.

Referring to the drawing, the foraminous inclosure in which the flies become imprisoned is preferably made in two parts, 1 and 2, the upper or dome-shaped part 2 being removable to permit the discharge of imprisoned insects from the trap when desired. To this end the parts 1 and 2, which are preferably made of woven wire or screen cloth, are formed with telescoping sheet metal meeting edges 3, 4, preferably by inclosing the free edges of the wire between the sides of folded or doubled sheet metal strips. The lower section 1 is formed with an integral substantially conical bottom wall 5, which projects upwardly within the space inclosed by its side walls. This conical portion has an inlet opening 6 at its apex, said opening affording the only communication from the outside to the space inclosed by the sections 1 and 2.

In common with other devices of this class, the fly trap herein illustrated provides a shallow pan 7 adapted to contain the bait or other substance relied upon to attract the flies. This pan 7 is disposed directly below the conical bottom 5 in supporting relation to the foraminous inclosure and is spaced therefrom by means of a plurality of ears 8, thus permitting the flies to enter the pan through the spaces between said ears 8. The ears 8 have outwardly turned projections 9, whose free ends closely engage the inner surface of a sheet metal skirt or ring 10, which depends somewhat below the upper edge of pan 7 and surrounds the same in spaced relation thereto, thus providing a free and unobstructed annular entering passage to the pan. The frictional engagement of the ears 8 with the skirt 10 unites these parts in operative position for the support of the trap from said pan in the manner hereinafter described, and at the same time permits the ready withdrawal of the pan when desired.

The skirt 10 has an inturned annular flange 11 at its upper end, and for coöperation with this flange 11, the outer wall of foraminous section 1 is provided with a bead 12, located just above the bottom of said wall. In this way, an annular ledge 13 is created at the lower end of section 1, which ledge is greater in diameter than the flange 11. In assembling the device, the flexibility of the wire cloth permits the compression of the section 1 so that the ledge 13 may be sprung over the flange 11, as shown in the figure, said flange 11 entering the bead 12, whereby the skirt 10 and section 1 are firmly united together in operative position. The connection between these parts is thus effected without the use of any rivets, pins, or other independent attaching devices usually employed to secure foraminous material to sheet metal parts.

When the pan 7 is subsequently entered into the skirt 10, the device is ready for use, the entire assembly being completed without using any rivets or other attaching devices. The operation is the same as in other devices of this class; the fly, after entering the pan, invariably moves upwardly into the space below the conical section 5, and finding no egress therefrom, passes through the opening 6 into the inclosed space of the trap. Once in this space, the fly does not escape through the opening 6, since he invariably crawls in an upward direction.

I claim,

1. In a fly trap, a rigid supporting member providing an inturned annular flange, and an inclosure having a wall of flexible material greater in diameter than said flange, and having a bead at its lower edge, whereby the contraction of said wall permits the springing of said bead over said flange, to hold the said parts in operative position.

2. In a fly trap, an inclosure having bottom and side walls made of foraminous material, and a rigid member providing an inturned annular flange for the support of said inclosure, said side walls of said inclosure being of greater diameter than said flange, and having above said bottom an annular recess, whereby the contraction of said walls permits the springing of said bottom within said flange, to retain the parts in operative position.

3. In a fly trap, a rigid supporting member providing an inturned annular flange, and an inclosure having a wall of screen material, whose diameter at the bottom is greater than the interior diameter of said flange, there being an annular recess formed in said wall above its lower edge, whereby, upon the contraction of said wall, said flange is received within said recess to hold the parts in operative position.

Dated this thirtieth day of March 1916.

FRANK D. HUNTOON.

Witnesses:
PENELOPE COMBERBACH,
NELLIE WHALEN.

Copies of this patent may be obtained for five cents each, by addressing the "Commissioner of Patents, Washington, D. C."